United States Patent Office.

EDWARD HUBBARD RUSSELL, OF PARK CITY, UTAH TERRITORY.

PROCESS OF PURIFYING HYPOSULPHITE LEACHING SOLUTIONS.

SPECIFICATION forming part of Letters Patent No. 320,590, dated June 23, 1885.

Application filed August 29, 1884. (No specimens.)

*To all whom it may concern:*

Be it known that I, EDWARD H. RUSSELL, of Park City, in the county of Summit, and in the Territory of Utah, have invented a Process of Purifying Hyposulphite Leaching Solutions; and I do hereby declare that the following is a full, clear, and exact description thereof.

In the ordinary process of leaching ores with a hyposulphite solution, water is usually first turned on and allowed to filter down through the mass of ore, to dissolve out and remove the salts soluble therein, which are formed in the roasting. After these salts have been washed out, a solution containing a hyposulphite of an alkali or alkali earth is turned on and allowed to filter through the ore. This dissolves and carries down with it the chloride of silver and one or two compounds of gold and other metals. After the solution has filtered down through the ore, it is conducted into precipitating tubs or tanks, and the metals are usually precipitated from it as sulphides. The solution is then ready to be used again. When the solution is used for some time, it accumulates impurities, which interfere with the action of the hyposulphite solution on the metal in the ore. Some of these impurities are inert and harmless; but others—particularly the caustic alkalies, hydrates of sodium, potassium, calcium, and magnesium—prevent a certain amount of silver from being dissolved out of the ore by the solution; consequently this portion of the silver remains with the ore, and is thrown away with the tailings.

The caustic alkalies—as, for instance, the hydrates of sodium and calcium—interfere with the action of the hyposulphite solution by converting a portion of the chloride of silver, which is soluble in the solution, into a hydrate or oxide which is insoluble therein. If the solution contains a small amount, even one-tenth of one per cent., of sodium or calcium hydrate, only ninety per cent. of the chloride of silver can be extracted by the solution in leaching, in some cases. The object of this invention is to neutralize these caustic alkalies. To do this I add to the hyposulphite solution containing them sulphate of iron or other soluble salt or compound of iron containing an agent having affinity for the alkaline impurities in the solution. In practice I add to such solution a solution of sulphate of iron until the green precipitate (hydrate of iron) ceases to form. The caustic alkalies are thus entirely destroyed, hydrate of iron, which is insoluble, and sulphate of soda or lime, which is harmless, being formed by the reaction.

Other cheap soluble compounds of iron (like the chloride) can also be used.

Any soluble salt or compound of iron containing an agent having affinity for the alkaline impurities in the hyposulphite solution can be used without departure from my invention.

In my process of purifying hyposulphite leaching solutions as covered by and described in the United States Patent granted to me March 25, 1884, No. 295,886, I use an acid—preferably sulphuric acid—to neutralize and remove the alkaline impurities from the solution. Such a process I do not intend to cover or claim in this application.

Having thus described my invention, what I claim is—

1. In the art of leaching ores with hyposulphite solutions wherein the solutions are reused after the precipitation of precious metals therefrom, the process of removing caustic alkalies from the solution, which consists in adding to the solution sulphate of iron, substantially as described.

2. As an improvement in the art of leaching with hyposulphite solutions, the process of purifying the solutions after they have been used, which consists in adding to the solution a solution of sulphate of iron to remove the alkaline impurities, substantially as described.

3. As an improvement in the art of leaching ores or metallurgical products with a hyposulphite solution, the process of removing caustic alkalies from the solution after use and preparing it for reuse, which consists in adding to it a solution of sulphate of iron until the green precipitate, consisting of hydrate of iron, ceases to form, substantially as set forth.

4. The process of removing alkaline impurities from hyposulphite leaching solutions, which consists in adding to the solution a soluble salt or compound of iron containing an agent having affinity for such alkaline impurities, substantially as and for the purpose described.

In testimony that I claim the foregoing I have hereunto set my hand this 21st day of August, 1884.

EDWARD HUBBARD RUSSELL.

Witnesses:
W. R. WAPLES,
A. D. MOFFAT.